(12) United States Patent
Belaunde et al.

(10) Patent No.: US 12,400,647 B2
(45) Date of Patent: Aug. 26, 2025

(54) DEVICE AND METHOD FOR PERFORMING ENVIRONMENTAL ANALYSIS, AND VOICE-ASSISTANCE DEVICE AND METHOD IMPLEMENTING SAME

(71) Applicant: ORANGE, Issy-les-Moulineaux (FR)

(72) Inventors: Mariano Belaunde, Chatillon (FR); Nicolas Pellen, Chatillon (FR); Régis Esnault, Chatillon (FR); Christian Gregoire, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/104,569

(22) Filed: Nov. 25, 2020

(65) Prior Publication Data
US 2021/0166688 A1 Jun. 3, 2021

(30) Foreign Application Priority Data
Nov. 29, 2019 (FR) ........................ 1913452

(51) Int. Cl.
*G10L 15/22* (2006.01)
*G06V 20/52* (2022.01)
(Continued)

(52) U.S. Cl.
CPC ............. *G10L 15/22* (2013.01); *G06V 20/52* (2022.01); *G08B 5/22* (2013.01); *G10L 15/30* (2013.01);
(Continued)

(58) Field of Classification Search
CPC ......... G10L 15/22; G10L 15/30; G10L 25/51; G10L 2015/223; G10L 15/02;
(Continued)

(56) References Cited

U.S. PATENT DOCUMENTS 4,091,366 A * 5/1978 Lavallee ................ G08B 25/10
340/539.1
5,995,553 A * 11/1999 Crandall .............. G08B 25/085
375/272
(Continued)

FOREIGN PATENT DOCUMENTS

FR 2968815 A1 * 6/2012 ............. G08B 21/02
WO 2019177870 A1 9/2019

OTHER PUBLICATIONS

English translation of the French Search Report and Written Opinion dated Jun. 23, 2020 for corresponding French Application No. 1913452, filed on Nov. 29, 2019.
(Continued)

*Primary Examiner* — Mohammad K Islam
(74) *Attorney, Agent, or Firm* — David D. Brush; Westman, Champlin and Koehler, P.A.

(57) ABSTRACT

An electronic device for performing environmental analysis, in particular a sound-analyzing object for voice assistance. The electronic device includes: a system for monitoring an environment in which the device is placed, and a visual physical indicator which is controlled depending on at least one command parameter delivered by the monitoring system. Thus, the user of the electronic device is able to perceive the object of attention of the monitoring system since the monitoring system provides feedback by using one or more visual indicators that the monitoring system commands.

16 Claims, 5 Drawing Sheets

(51) Int. Cl.
  *G08B 5/22*      (2006.01)
  *G10L 15/30*     (2013.01)
  *G10L 25/51*     (2013.01)
  *H04R 1/40*      (2006.01)
  *H04R 3/00*      (2006.01)

(52) U.S. Cl.
  CPC .............. *G10L 25/51* (2013.01); *H04R 1/406* (2013.01); *H04R 3/005* (2013.01); *G10L 2015/223* (2013.01)

(58) Field of Classification Search
  CPC ............... G10L 25/66; G10L 2015/025; G10L 2015/088; G06V 20/52; G08B 5/22; G08B 21/02; G08B 21/0469; G08B 21/0476; G08B 21/043; H04R 1/406; H04R 3/005; H04R 2201/401
  See application file for complete search history.

(56) References Cited

U.S. PATENT DOCUMENTS

| | | | |
|---|---|---|---|
| 8,885,639 B1* | 11/2014 | Robbins | H04M 7/006 |
| | | | 379/88.13 |
| 9,460,340 B2* | 10/2016 | Kauffmann | H04N 5/2621 |
| 10,482,904 B1* | 11/2019 | Hardie | G10L 15/20 |
| 10,789,822 B1* | 9/2020 | Deutsch | G08B 13/19613 |
| 10,825,318 B1* | 11/2020 | Williams | G16H 50/20 |
| 11,082,460 B2* | 8/2021 | Nesta | H04N 7/147 |
| 11,145,301 B1* | 10/2021 | Rao | G10L 15/22 |
| 11,412,157 B1* | 8/2022 | Slavin | G06V 20/52 |
| 2004/0257210 A1* | 12/2004 | Chen | G08B 25/016 |
| | | | 340/539.18 |
| 2008/0104512 A1 | 5/2008 | Tarlton et al. | |
| 2010/0149573 A1 | 6/2010 | Pat et al. | |
| 2011/0156898 A1* | 6/2011 | Taillefer | G08B 25/016 |
| | | | 340/539.11 |
| 2013/0278631 A1* | 10/2013 | Border | G06F 3/04842 |
| | | | 345/633 |
| 2013/0339019 A1* | 12/2013 | Giancarlo | G10L 15/04 |
| | | | 704/251 |
| 2014/0015964 A1* | 1/2014 | Chew | H04N 5/77 |
| | | | 348/E7.024 |
| 2016/0335484 A1* | 11/2016 | Xie | H04N 7/181 |
| 2017/0125034 A1* | 5/2017 | Kakadiaris | G06F 3/165 |
| 2017/0193180 A1* | 7/2017 | Kusens | G08B 21/02 |
| 2017/0206064 A1 | 7/2017 | Breazeal et al. | |
| 2017/0300757 A1* | 10/2017 | Wolf | G06T 7/90 |
| 2017/0374192 A1* | 12/2017 | Gersten | H04N 5/772 |
| 2018/0018861 A1* | 1/2018 | Locke | H04N 13/204 |
| 2018/0040223 A1* | 2/2018 | Bodi | G08B 21/18 |
| 2018/0050800 A1* | 2/2018 | Boykin | H04N 21/2368 |
| 2018/0157915 A1* | 6/2018 | Sherry | H04N 21/84 |
| 2018/0232592 A1* | 8/2018 | Stewart | G08B 13/19606 |
| 2018/0300557 A1* | 10/2018 | Rodenas | G08B 13/19613 |
| 2018/0325469 A1* | 11/2018 | Fountaine | G08B 21/0469 |
| 2018/0330169 A1* | 11/2018 | van Hoof | G06V 20/46 |
| 2018/0349708 A1* | 12/2018 | van Hoof | G08B 13/19684 |
| 2019/0095586 A1* | 3/2019 | McBrady | G16H 10/60 |
| 2019/0139390 A1* | 5/2019 | Kawazu | G08B 21/043 |
| 2019/0147721 A1* | 5/2019 | Avitan | G06F 1/3209 |
| | | | 340/573.1 |
| 2019/0202063 A1 | 7/2019 | Shukla | |
| 2020/0014885 A1* | 1/2020 | Carey | H04N 7/181 |
| 2020/0090662 A1* | 3/2020 | Castro | G06F 1/1683 |
| 2020/0110443 A1* | 4/2020 | Leong | G02F 1/133308 |
| 2020/0279240 A1* | 9/2020 | Glaser | G06Q 20/20 |
| 2021/0020008 A1* | 1/2021 | Deutsch | G08B 13/19613 |
| 2021/0234953 A1* | 7/2021 | Bracken | G08B 21/0469 |
| 2021/0264915 A1* | 8/2021 | Nagata | G10L 15/24 |
| 2021/0329165 A1* | 10/2021 | Liu | G06F 21/6245 |
| 2021/0383806 A1* | 12/2021 | Kim | G06F 3/16 |
| 2024/0125915 A1* | 4/2024 | Au | G01S 13/765 |

OTHER PUBLICATIONS

European Office Action dated Oct. 18, 2024 for corresponding EP Application No. 20 207 266.0.

* cited by examiner

DEVICE AND METHOD FOR PERFORMING ENVIRONMENTAL ANALYSIS, AND VOICE-ASSISTANCE DEVICE AND METHOD IMPLEMENTING SAME

TECHNICAL FIELD

The invention relates to a device for performing environmental analysis, in particular a sound-analyzing object. Generally, the invention relates to voice assistance.

PRIOR ART

Voice assistance, which at the present time is present on our smartphones and tablets in the form of software applications such as Google Assistant™, Amazon Alexa™, Siri™, Djingo™, etc. but also available in the form of smart speakers or voice assistants such as Google Home™, Apple HomePod™, Amazon Echo™, Djingo Speaker™, etc. is a human-machine interface via audio.

It uses a microphone to listen to the environment in order to detect the voice-assistance activation voice command, then, once activated, to receive and process voice commands from the user.

The problem is that currently users are being warned by certain papers that certain devices employing voice assistance seem to record more information than intended and even to transmit information to equipment for providing the voice-assistance service located outside of the home communication network. Even if these faults have been resolved and were not the subject of sale to the general public, inter alia, this has reinforced the aversion of some of the general public to acceptance of voice assistance. In order to allow a wider deployment of these smart speakers, the latter must be designed to increase confidence in the digital world of the smart home while respecting privacy even though these two tendencies are sometimes antagonistic to the services performed by these new technologies.

In order to respect privacy, the microphone arrays of smart speakers point toward the person speaking or, more precisely, privilege, by virtue of source separation, a listening direction. Next, these smart speakers extract a linguistic signal from the captured signal (especially by separating the linguistic signal and ambient noise or clamor in this captured signal). Thus, the word recognition receives a signal of better quality improving its recognition performance.

However, these processing operations are imperceptible to the user. The latter is unaware that the smart speaker is focused on what he is saying rather than what his neighbor is saying because the reply delivered by the smart speaker is ostensibly relevant to the dialogue intentionally initiated by the user with the smart speaker.

In contrast, when a first person engages in a dialogue with a smart speaker, but the smart speaker is better able to capture what a second person is saying, the dialogue will be centered on the words spoken by the second person. The two persons will then be unsettled because the first person will not obtain his reply and the second person will realize that the smart speaker was listening to him even though he was not speaking to it.

For this reason, currently, there is a perception that smart speakers are listening to everything. This perception is slowing the adoption and use of smart speakers, which may especially be used to optimize the use of household resources. More generally, a microphone that captures ambient noise is a problem with regard to acceptance of a system equipped with such a microphone, for reasons to do with protection of privacy.

SUMMARY OF THE INVENTION

One of the aims of the present invention is to remedy drawbacks/insufficiencies of the prior art/to provide improvements with respect to the prior art.

One subject of the invention is an electronic device for performing environmental analysis, comprising:
 a system for monitoring an environment in which the electronic device for performing environmental analysis is placed, and
 a visual physical indicator controlled depending on at least one command parameter delivered by the monitoring system.

Thus, the user of the electronic device is able to perceive the object of attention of the monitoring system since the monitoring system provides feedback by means of one or more visual indicators that the monitoring system commands.

Advantageously, the visual physical indicator is a simulator of a facial element of a living being. Thus, the risk of errors in interpretation by the user or a third-party device of the data captured by the monitoring system is decreased because the user is used to interpreting certain facial behaviors. The third-party device is especially a video surveillance device for monitoring the dwelling in which the monitoring system is placed.

Advantageously, the visual physical indicator comprises a set of rendering devices.

Thus, since certain of the rendering devices may be controlled independently and/or other rendering devices may be controlled conjointly, depending on the same data or separate captured data, the risks of errors in interpretation by the user or a third-party device of the data captured by the monitoring system is decreased.

Advantageously, when the set of rendering devices comprises more than one rendering device, the rendering devices of the set are conjointly controllable depending on at least one command parameter delivered by the monitoring system.

Thus, simultaneous command of a plurality of parameters allows the degree of confidence of the monitoring system in the captured data to be transmitted.

Advantageously, the rendering devices consist of at least one of the following devices:
 a diode;
 a matrix-array display;
 a screen;
 a moving part of the electronic device of performing environmental analysis.

Thus, the precision of the interpretation by the user or a third-party device of the data captured by the monitoring system increases or decreases depending on the one or more visual physical indicators used.

Advantageously, the monitoring system comprises a sensor and an analyzer that receives data captured by the sensor and that controls the visual physical indicator by transmitting thereto at least the command parameter.

Thus, the analyzer is able to control with relative subtlety the visual physical indicator, depending on its analysis capacity: direction of monitoring focus, ability to monitor one or more types of captured data (sound, image, video, vibrations, etc.), ability to distinguish between the number of sources captured, the type of sources captured, the type of interaction with the captured source, etc.

Advantageously, the monitoring system comprises at least one system from the following:
- a listening system,
- a video monitoring system,
- a haptic/touch monitoring system.

Advantageously, the listening system comprises at least one device from the following:
- a microphone,
- a breakout board equipped with a least one microphone.

Advantageously, the listening system comprises a plurality of unitary microphones forming an array of microphones integrated into the device for performing environmental analysis.

Thus, depending on the arrangement of the array and on the position of the device for performing environmental analysis in a given environment, the device for performing environmental analysis listens to sound from a given portion or the entirety of the environment.

Advantageously, the electronic device for performing environmental analysis comprises at least one connector able to allow the transmission of a command from the electronic device performing environmental analysis to a controllable electronic device, the command being delivered by the monitoring system. Thus the risk of untimely command or of erroneous command of a remote controllable electronic device is decreased.

Another subject of the invention is a method for performing environmental analysis, said method being implemented by an electronic device for performing environmental analysis and comprising:
- monitoring an environment in which the electronic device for performing environmental analysis is placed,
- generating a visual physical rendering depending on a command parameter resulting from the analysis of the captured data.

Advantageously, the command parameter is determined on the basis of a portion of the data captured in the environment, the portion of the captured data being relative to one data source in the environment.

Advantageously, the monitoring comprises
- capturing data from the environment, and
- analyzing the captured data to deliver the command parameter.

Advantageously, the method for performing environmental analysis comprises sending a notification to a communication terminal, the notification being generated depending on the result of the analysis of the captured data.

Yet another subject of the invention is a voice assistant connected to a communication network allowing at least one service performed by a communication device of the communication network to be controlled, the voice speaker comprising:
- a system for monitoring an environment in which the voice assistant is placed, and
- a visual physical indicator controlled depending on at least one command parameter delivered by the monitoring system.

Thus, not only is acceptance by the user of a voice assistant in his environment increased because the user perceives the actions of the monitoring system, but furthermore the risk of untimely or erroneous use of the voice assistant is limited.

Another subject of the invention is a voice-assistance method implemented by a communication terminal connected to a communication network, comprising controlling at least one service performed by a communication device of the communication network other than the communication terminal, the voice-assistance method comprising:
- monitoring an environment in which the communication terminal is placed,
- generating a visual physical rendering depending on a command parameter resulting from the analysis of the captured data.

Advantageously, according to one implementation of the invention, the various steps of the method according to the invention are implemented by a software package or computer program, this software package comprising software instructions intended to be executed by a data processor of a device for performing environmental analysis and/or a voice assistant and being designed to control the execution of the various steps of this method.

The invention therefore also relates to a program containing program-code instructions for executing steps of the method for performing environmental analysis and/or of the voice-assistance method when said program is executed by a processor.

This program may use any programming language and take the form of source code, object code or code intermediate between source code and object code such as code in a partially compiled form or any other desirable form.

BRIEF DESCRIPTION OF THE DRAWINGS

Features and advantages of the invention will become more clearly apparent on reading the description, which is given by way of example, and the figures, which are referred to in the description, and which show.

DESCRIPTION OF EMBODIMENTS

Figure 1:
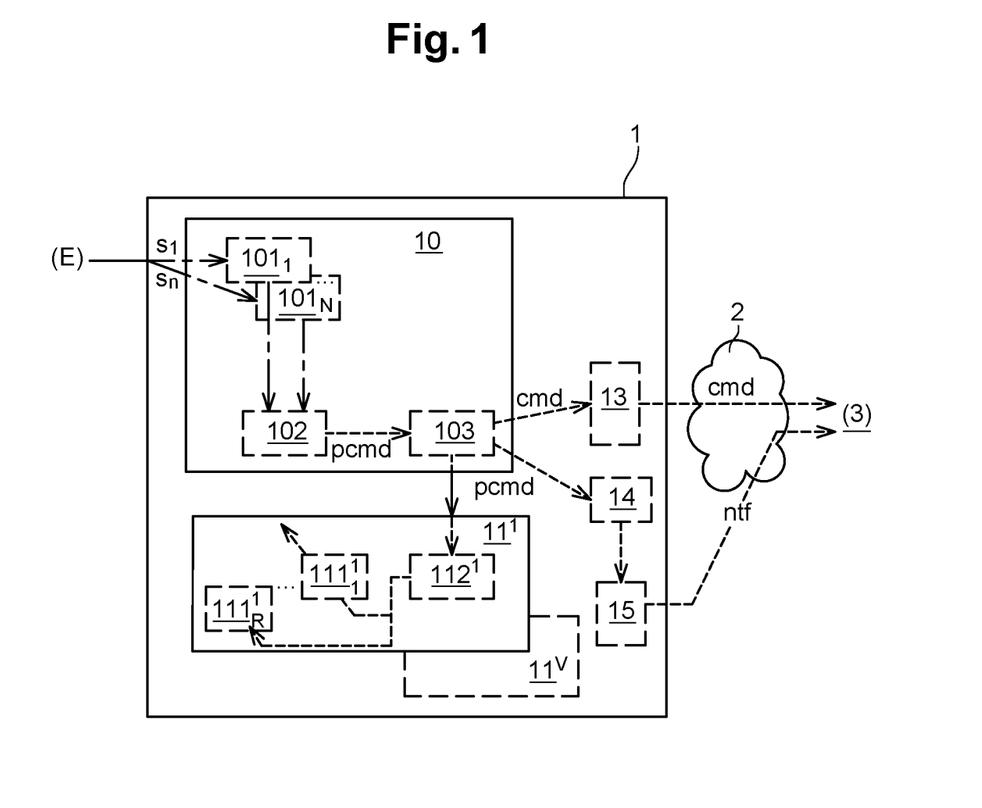
FIG. 1, a simplified schematic of a device for performing environmental analysis according to the invention, FIG. 2, a simplified schematic of a method for performing environmental analysis according to the invention, FIG. 3, a simplified schematic of one embodiment of a device for performing environmental analysis according to the invention, FIG. 4, a simplified schematic of a communication architecture comprising a device for performing environmental analysis according to the invention, FIG. 5, a simplified schematic of a device for performing environmental analysis comprising a sensor array according to the invention, FIG. 6a, a simplified schematic of a device for performing environmental analysis in a first exemplary monitoring state according to the invention, FIG. 6b, a simplified schematic of a device for performing environmental analysis in a second exemplary monitoring state according to the invention, FIG. 6c, a simplified schematic of a device for performing environmental analysis in a third exemplary monitoring state according to the invention, FIG. 6d, a simplified schematic of a device for performing environmental analysis in a fourth exemplary monitoring state and a first example of a monitoring result according to the invention, FIG. 6e, a simplified schematic of a device for performing environmental analysis in a second example of a monitoring result according to the invention, FIG. 6f, a simplified schematic of a device for performing environmental analysis in a third example of a monitoring result according to the invention, FIG. 6g, a simplified schematic of a device for performing environmental analysis in one exemplary state of the analysis-performing device according to the invention, FIG. 7, a simplified schematic of a voice assistant according to the invention, FIG. 8, a simplified schematic of a voice-assistance method according to the invention.

FIG. 1 illustrates a simplified schematic of a device for performing environmental analysis according to the invention.

The electronic device 1 for performing environmental analysis comprises:
- a system 10 for monitoring an environment E in which the electronic device 1 for performing environmental analysis is placed, and
- a visual physical indicator $11^1, \ldots, 11^V$ controlled depending on at least one command parameter pcmd delivered by the monitoring system 10.

The visual physical indicator $11^1, \ldots, 11^V$ is a human-machine interface that especially indicates in which direction the attention of the monitoring system 10, and especially of the one or more microphones of this monitoring system 10, is being focused, in particular when said system is able to perceive/is listening to words spoken by a person, changes person, detects a specific event (especially a specific sound) or begins to monitor a new signal.

In particular, the visual physical indicator $11^1, \ldots, 11^V$ is a simulator of a facial element of a living being. In particular, a simulator of a facial element of an animal, of a human or of a humanoid, such as a simulator of gaze direction, a simulator of facial expressions, a simulator of position of a body part of an animal (ears, tail, etc.), may be used. The simulator of a facial element of a living being copies the movement, position, etc. of this facial element depending on the environmental context cntxte, which is for example delivered by the monitoring system 10 in the command parameter pcmd.

In particular, the visual physical indicator $11^1, \ldots, 11^V$ comprises at least a rendering device $111^1_1, \ldots 111^1_R$ and a controller $112^1$. The controller $112^1$ uses the command parameter cmd to trigger a state of one or more rendering devices $111^1_1, \ldots 111^1_R$. For example, the state is selected by the controller $112^1$ from a list of possible states of the rendering device $111^1_1, \ldots 111^1_R$. In another example, depending on the type of rendering device, the state designates a behavior performed by the visual physical indicator $11^1, \ldots, 11^V$ depending on the environmental context cntxte when the visual physical indicator $11^1, \ldots, 11^V$ is a simulator of a facial element. In particular, when the rendering device is an LED, the state may be a light-intensity level, a color, etc. If the rendering device is a black-and-white mini-screen simulating an eye, the state may be a pupil shape: round, slit, closed and/or a position: right, left, top, bottom, etc.

In particular, the physical visual indicator $11^1$ comprises a set of rendering devices $\{111^1_1 \ldots 111^1_R\}$. In particular, the rendering devices $111^1_1 \ldots 111^1_R$ may be identical (the same type of screen or motorized part, etc.) for example in order to respectively mimic two eyes, two ears, etc., or be different in order to mimic various elements of the face of a living being: eye, ear, etc.

In particular, when the set of rendering devices $\{111^1_1 \ldots 111^1_R\}$ comprises more than one rendering device $111^1_1 \ldots 111^1_R$, the rendering devices of the set $\{111^1_1 \ldots 111^1_R\}$ are controllable conjointly depending on the at least one command parameter pcmd delivered by the monitoring system. For example, two screens simulating eyes and/or two motorized parts simulating ears are controlled conjointly to indicate a direction (the two eyes and/or the two ears point in a single direction), a doubt, a reflection, etc.

In particular, the rendering devices consist of at least one of the following devices:
- a diode;
- a matrix-array display;
- a screen;
- a moving part of the electronic device for performing environmental analysis.

The moving parts of the electronic device for performing environmental analysis especially simulates an ear, a tail, etc. The mobility of the part is controllable especially by means of a motor. The mobility is for example a mobility in rotation and/or an angular mobility (the ear making an angle of 0 to 180° to a lateral surface of the device for performing environmental analysis).

In particular, the monitoring system 10 comprises a sensor $101_1 \ldots 101_N$ and an analyzer 102 that receives captured data $dc_1 \ldots dc_N$ from the sensor $101_1 \ldots 101_N$ and the controls the visual physical indicator $11^1 \ldots 11^V$ by transmitting thereto at least the command parameter pcmd.

In particular, the monitoring system 10 comprises at least one system from the following:
- a listening system,
- a video surveillance system,
- a haptic and/or touch monitoring system.

By listening system, what is meant is a system able to monitor the audio environment: word(s) and/or sound(s), such as sounds emitted by electronic or non-electronic objects: sound of keys on a table, sound of a window being open/closed, sound indicating the end of a cooking time, sound of a dishwasher working, boiling water, etc.

By video surveillance system, what is meant is a system able to monitor for the presence of a person or apparatus in the environment (and especially allowing the person and/or apparatus to be identified and located in the environment).

By touch monitoring system, what is meant is a system able to monitor contacts with the device for performing environmental analysis. In particular, the electronic device for performing environmental analysis comprises at least one touch surface and/or all or part of the external surface of the object is a touch surface: for example the top part and/or the one or more lateral parts and/or the front part and/or, in the case where the electronic device for performing environmental analysis is placed on a horizontal surface, the rear part and/or, in the case where the object is placed against a vertical surface, the bottom portion. Thus, the touch monitoring system detects the contact of a person with the electronic device for performing environmental analysis and/or the position of the person with respect to this device for performing environmental analysis.

By haptic monitoring system, what is meant is a system able to monitor vibrations and movements. In particular, the electronic device for performing environmental analysis is equipped with vibration and/or movement sensors such as accelerometers that are able to detect:
- an object, an apparatus or a person placed in contact with the horizontal surface on which the electronic device for performing environmental analysis is placed;
- a movement or a vibration of the vertical surface on which the electronic device for performing environmental analysis is placed, such as the movement of the door on which it is placed (a fridge or freezer being opened/closed) or the vibration of a wall on which it is placed (door and/or window of this wall being opened/closed);

an airflow generated by a door/window being opened/closed; etc.

In particular, the listening system 10 comprises at least one device among the following:
a microphone,
a breakout board equipped with at least one microphone.

Figure 5:
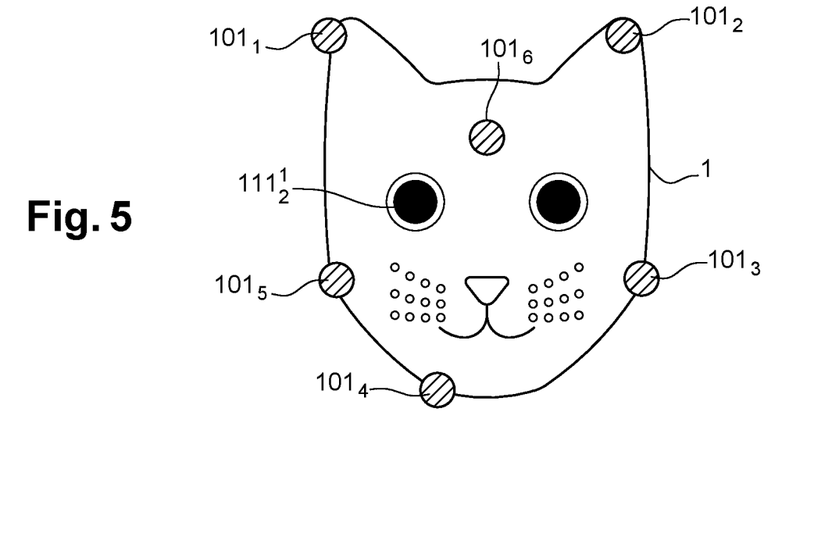

In particular, the listening system 10 comprises a plurality of unitary microphones forming an array of microphones integrated into the electronic device 1 for performing environmental analysis (as especially illustrated in FIG. 5).

In particular, the electronic device 1 for performing environmental analysis comprises at least one connector 13 able to allow the transmission of a command cmd from the electronic device 1 for performing environmental analysis to a controllable electronic device 3. The command cmd is delivered by the monitoring system 10.

In particular, the electronic device 1 for performing environmental analysis comprises at least one notification generator 14 able to generate, depending on the command parameter, a notification ntf, and a transmitter 15 able to send the generated notification ntf from the electronic device 1 for performing environmental analysis to a controllable electronic device 3.

Electronic device 1 for performing environmental analysis is placed in a given environment E, for example an interior space such as a room of a house, of an apartment, of an office block, a garage, a region of a hangar, of a factory, etc., or an exterior space such as a patio, a parking lot, a space containing a swimming pool, etc.

The monitoring system 10 monitors this environment E by virtue of various signals $s_1 \ldots s_O$ emitted thereby: audio signals, light signals, vibrations, touch signals, etc.

In particular, the monitoring system comprises one or more sensors $101_1 \ldots 101_N$ that capture some of these signals: signals of a single type (audio sensors or video/image sensors or haptic sensors, etc.) or of various types (audio sensors and/or video/image sensors and/or haptic sentences, etc.) that deliver, on the basis of the signals $s_1 \ldots s_O$, captured data $dc_1 \ldots dc_N$.

In particular, the monitoring system comprises an analyzer 102 able to determine, depending on the environmental signals $s_1 \ldots s_O$, one or more parameters of environmental contexts. In particular, the analyzer 102 identifies, depending on the environmental signals $s_1 \ldots s_O$, a number of sources of signals (source of audio and/or visual and/or haptic signals), and/or determines a position of one or more of the sources of signals, and/or an intensity of one or more of these sources of signals.

Optionally, the analyzer 102 comprises one or more elementary analyzers (not illustrated) that perform an analysis of signals of a given type (audio signal or video signal or haptic signal, etc.). In particular, the analyzer 102 comprises an aggregator (not illustrated) for integrating a plurality or even all of the captured data $dc_1 \ldots dc_N$ of a given type (audio, video or haptic) with a view to performing one or more processing operations.

The analyzer 102 especially comprises an identifier and/or locator (not illustrated) of sources of signals that receives captured data $dc_1 \ldots dc_N$, and especially captured data of a given type, or captured data of a plurality of given types, or aggregated captured data delivered by the aggregator of the analyzer 102. Optionally, the analyzer 102 comprises an extractor (not illustrated) of per-source captured data, which delivers a signal corresponding to captured data originating from a given source (for example an identified source). The extractor of per-source captured data, which is also referred to as the source separator, may be coupled with voice recognition in order to allow various human sources to be recognized and/or coupled to a detector of specific sounds that recognizes the meaning of a sound and/or that compares a sound to sounds classed in a sound database (door opening/closing, oven beeping, identified machines (washing machine, dishwasher, microwave, etc.) starting/stopping, various water-related noises (faucet, shower, boiling, flush, etc.), glass breaking, barking, etc.).

The identifier and/or locator of sources is especially placed downstream of the per-source extractor. Furthermore, the analyzer 102 comprises a detector (not illustrated) of the environmental context able to identify an action of a source: door opening/closing, microwave beep signaling end of cooking, voice command of the user, etc.

In particular, the monitoring system 10 comprises a controller 103 that is able to control at least one visual physical indicator by setting one or more command parameters pcmd of one or more visual physical indicators $11^1, \ldots, 11^V$ depending on the detected environmental context, and/or on the identified source and/or on the position of the identified source, etc. Optionally, the controller 103 is also able to control a remote device 3 via a communication network 2 by means of a command cmd set depending on the detected environmental context and/or on the identified source and/or on the position of the identified source, etc.

In particular, a communication terminal, such as a smart phone or a tablet, for example implementing a voice assistant, implements the device for performing environmental analysis according to the invention. In this case, the visual physical indicator is especially a portion of the screen of the communication terminal. Optionally, this portion of the screen simulates the face of a living being.

Figure 2:
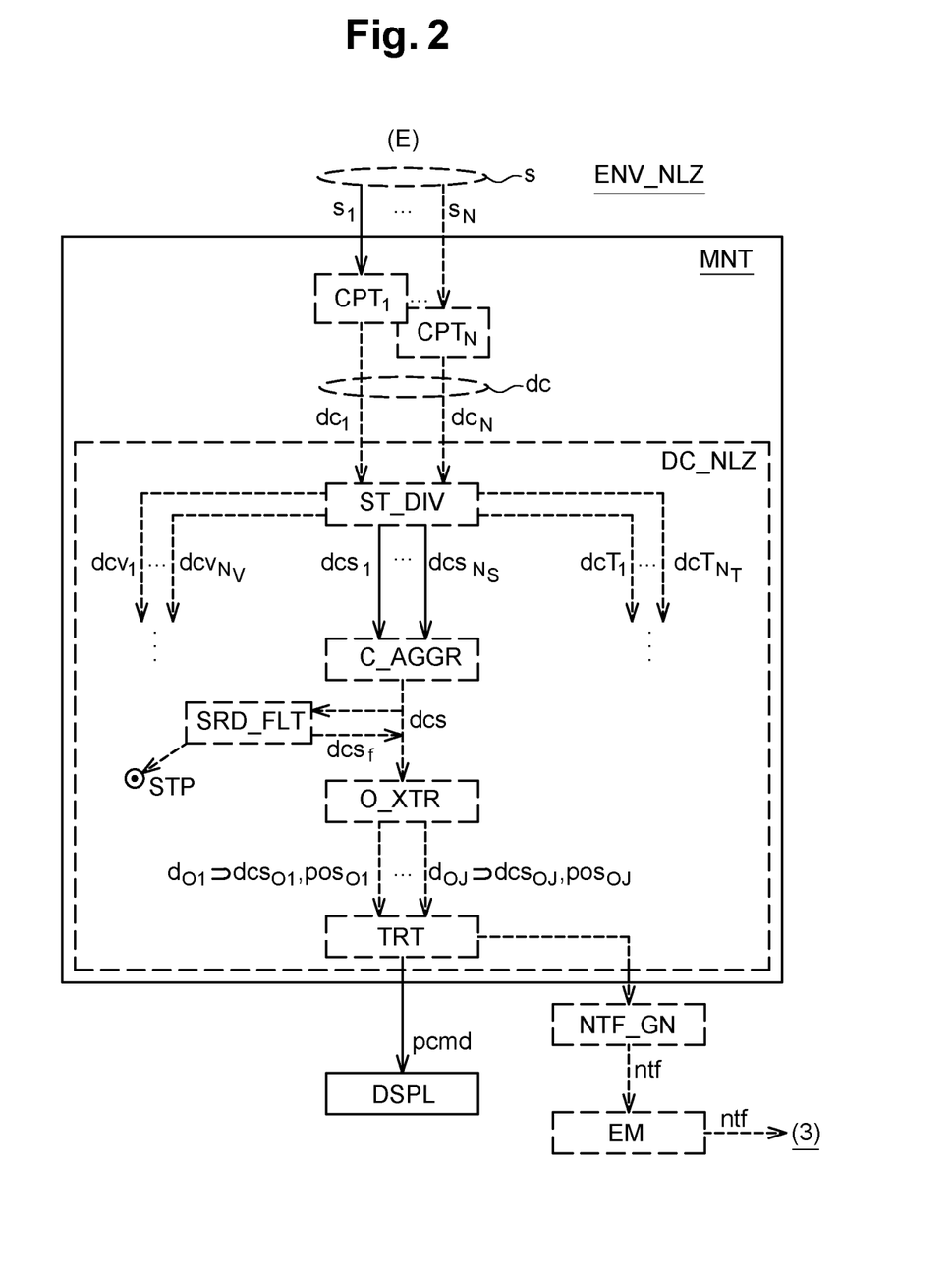

FIG. 2 illustrates a simplified schematic of a method for performing environmental analysis according to the invention.

The method ENV_NLZ for performing environmental analysis implemented by an electronic device 1 for performing environmental analysis comprises:
monitoring MNT an environment E in which the electronic device 1 for performing environmental analysis is placed,
generating a visual physical rendering DSPL depending on a command parameter pcmd resulting from the monitoring MNT of the environment.

In particular, the command parameter pcmd is determined on the basis of a portion of the data $d_{O1} \ldots d_{OJ}$ captured in the environment E, the portion of the captured data $d_{O1} \ldots d_{OJ}$ being relative to one data source $O_1 \ldots O_J$ in the environment E.

In particular, the monitoring MNT comprises
capturing $CPT_1 \ldots CPT_N$ data from the environment, and
analyzing DC_NLZ the captured data $dc_1 \ldots dc_N$ to deliver the command parameter pcmd.

In particular, the method ENV_NLZ for performing environmental analysis comprises an operation of sending EM a notification ntf to a communication terminal 3, the notification ntf being generated depending on the result of the analysis DC_NLZ of the captured data.

In particular, an environment E contains a plurality of sources $O_1 \ldots O_J$ of signals. The signals $s_1 \ldots s_N$ are, especially, received by the sensors $CPT_1 \ldots CPT_N$, which deliver captured data $dc_1 \ldots dc_N$. Optionally, an analysis DC_NLZ of the captured data processes the captured data delivered by the sensors $CPT_1 \ldots CPT_N$.

In particular, the analysis DC_NLZ of the captured data comprises a separator ST_DIV of captured data that separates the data depending on their type: audio data $dcs_1 \ldots dcs_{Ns}$, video data $dcv_1 \ldots dcv_{Nv}$, haptic data $dct_1 \ldots dct_{Nt}$, etc.

Optionally, the analysis DC_NLZ of the captured data comprises an aggregation C_AGGR of captured data, especially by type of captured data as illustrated in FIG. 2. The aggregation C_AGGR delivers aggregated captured data, for example aggregated audio data dcs as shown in FIG. 2.

In particular, the analysis DC_NLZ of the captured data comprises an operation of filtering SRD_FLT ambient noise, which delivers filtered captured data corresponding to the captured data from which data corresponding to ambient noise has been removed. Optionally, if at the time t the monitoring MNT leads to only noise being received, the operation of filtering SRD_FLT ambient noise will deliver no filtered captured data for this time and will stop STP the analysis DC_NLZ of the data captured at the time t, restarting only when further data are captured at the following time t+1.

In particular, the analysis DC_NLZ of the captured data comprises an operation of extracting O_XTR per-source data. The operation of extracting O_XTR per-source data is carried out either directly on all of the captured data $dc=\{dc_1 \ldots dc_N\}$, or on all of the captured data of a given type $dcv=\{dcv_1 \ldots dcv_{Nv}\}$, $dcs=\{dcs_1 \ldots dcs_{Ns}\}$, $dct=\{dct_1 \ldots dct_{Nt}\}$. The operating of extracting O_XTR data delivers per-source data $d_{O1} \ldots dc_{OJ}$, the captured data $dcs_{O1} \ldots dcs_{OJ}$ of which originate from a specific source, and, optionally, the (or the more than one) position(s) $pos_{O1} \ldots pos_{OJ}$ of the (or the more than one) source(s).

In particular, the analysis DC_NLZ of the captured data comprises a processing operation TRT, such as a detection of environmental context able to identify an action of a source: door opening/closing, microwaved beep signaling end of cooking, voice command of a user, etc.

In particular, the processing operation TRT allows one or more command parameters pcmd of a visual physical rendering DSPL to be determined depending on the detected environmental context, and/or on the identified source and/or on the position of the identified source, etc. Optionally, the processing operation is also able to set a command for a remote device 3, which is controlled via a communication network 2 depending on the detected environmental context, and/or on the identified source and/or on the position of the identified source, etc.

In particular, the environmental analysis ENV_NLZ comprises at least one operation of generating NTF_GN a notification able to generate, depending on the command parameter, a notification ntf and a sending operation EM able to send the generated notification ntf from the electronic device 1 for performing environmental analysis to a controllable electronic device 3.

In one particular embodiment, the method ENV_NLZ for performing environmental analysis is implemented in the form of a program comprising program-code instructions for executing the steps of a method for performing environmental analysis when said program is executed by a processor.

Figure 3:
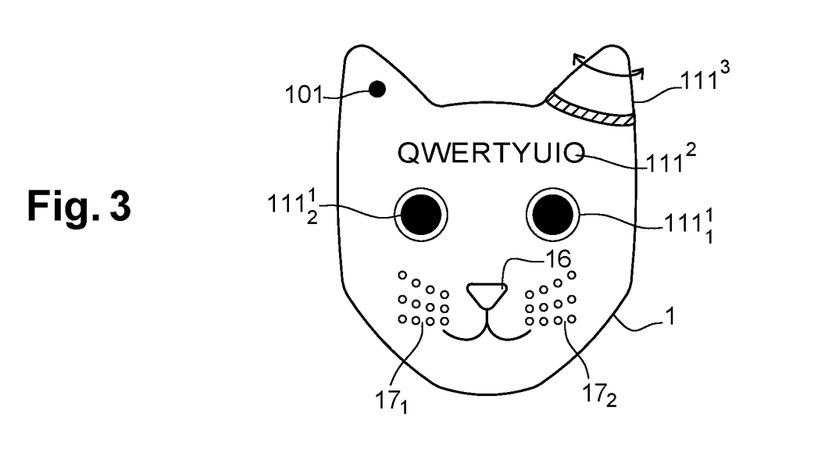

FIG. 3 illustrates a simplified schematic of one embodiment of a device for performing environmental analysis according to the invention.

The shape of the device 1 for performing environmental analysis is that of a cat's face. It comprises at least one audio sensor 101 and a plurality of visual physical indicators including two mini-screens $111^1{}_2$ and $111^1{}_1$ allowing eyes to be simulated, at least one moving part $111^3$ allowing an ear to be simulated, and a matrix-array screen $111^2$. The matrix-array screen $111^2$ especially allows a word of given length to be displayed.

In the case where the device 1 is also a smart speaker, it furthermore comprises at least one loud-speaker $17_1$, $17_2$, and optionally a button 16, such as an on/off button, allowing the device for performing environmental analysis and/or the smart speaker to be controlled.

Figure 4:
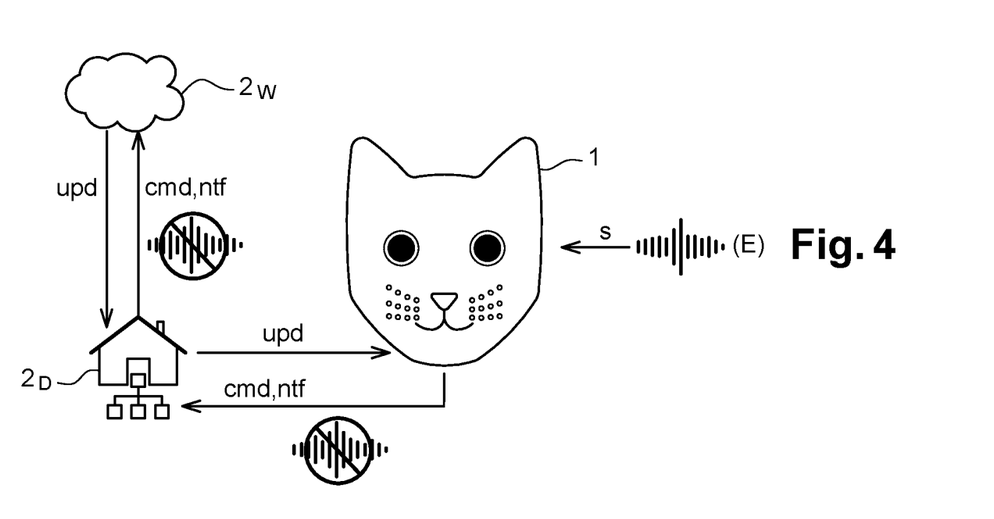

FIG. 4 illustrates a simplified schematic of a communication architecture comprising a device for performing environmental analysis according to the invention.

The device 1 for performing environmental analysis is placed, or even located, in an environment E that it monitors, especially by capturing signals s. Optionally, the device 1 for performing environmental analysis is connected to a local network 2D and/or to a remote network 2W. Thus, the device 1 for performing environmental analysis delivers commands cmd or notifications ntf to a device (not illustrated) of the local network or of a remote device. In particular, the notifications ntf trigger access to exterior services (allowing SMS messages to be sent, the Internet or a communication device of the home network 2D to be accessed, etc.).

Optionally, this connection to a network 2D or 2W allows the device 1 for performing environmental analysis to be updated upd. The commands of the update upd may be received directly from the remote communication network 2W or received beforehand by a communication device of the local communication network 2D then loaded onto the device 1 for performing environmental analysis.

Only the commands or notifications exit the local network 2D, the signals s are not transmitted to the remote network 2W.

FIG. 5 illustrates a simplified schematic of a device for performing environmental analysis comprising a sensor array according to the invention.

In order to cover the entirety of the environment E in which the device 1 for performing environmental analysis is placed it comprises an array of sensors $101_1 \ldots 101_6$. In particular, the sensor array is an microphone array.

Figure 6A:
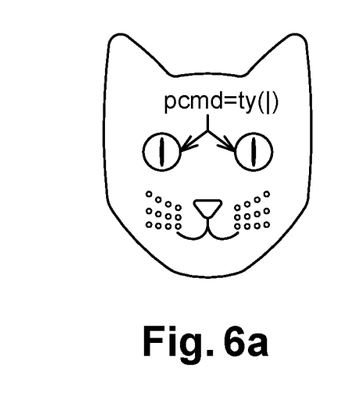

FIG. 6a illustrates a simplified schematic of a device for performing environmental analysis in a first exemplary monitoring state according to the invention.

In this first exemplary monitoring state, the analyzer 102 of the monitoring system 10 has detected a specific sound, this corresponding to a state of the monitoring system referred to as the "sound detected" state. The monitoring system 10 accordingly commands the visual physical indicator to simulate a facial attitude corresponding to that adopted when a sound is heard: in the present case by transmitting a command parameter that causes an eye with a slitted pupil to be simulated, and especially by indicating in the command parameter the type of simulated eye pcmd=ty(I).

Figure 6B:
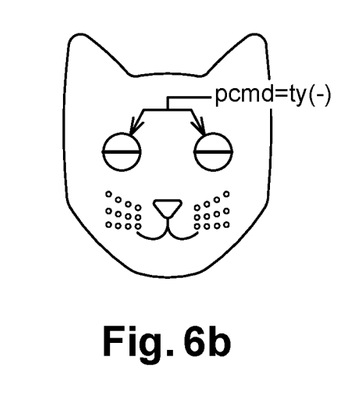

FIG. 6b is a simplified schematic of a device for performing environmental analysis in a second exemplary monitoring state according to the invention.

In this second exemplary monitoring state, the monitoring system 10 is in standby or asleep, i.e. it is listening to the environment in which the device for performing environmental analysis is placed, in particular, it captures ambient sounds while waiting to detect a sound to be analyzed. The monitoring system 10 accordingly commands the visual physical indicator to simulate the facial attitude that corresponds to this standby state: in the present case by transmitting a command parameter that causes a closed eye to be simulated, and especially by indicating in the command parameter the type of simulated eye pcmd=ty(-).

Figure 6C:
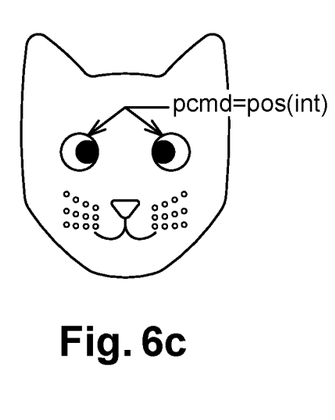

FIG. 6c illustrates a simplified schematic of a device for performing environmental analysis in a third exemplary monitoring state according to the invention.

In this third exemplary monitoring state, the analyzer 102 of the monitoring system 10 has identified the type of sound detected, this corresponding to a state of the monitoring system referred to as the "sound being analyzed" state. The monitoring system 10 accordingly commands the visual physical indicator to simulate a facial attitude corresponding to that adopted when a sound has been identified/is being analyzed: in the present case by transmitting a command parameter that causes an eye with a round, counter-clockwise rotating or inwardly looking pupil to be simulated, and especially by indicating in the command parameter the type of simulated eye pcmd=ty(int).

Figure 6D:
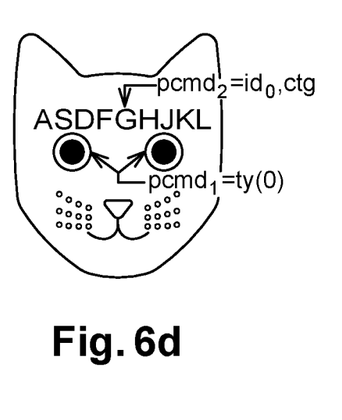

FIG. 6d illustrates a simplified schematic of a device for performing environmental analysis in a fourth exemplary monitoring state and a first example of a monitoring result according to the invention.

In this fourth exemplary monitoring state, the analyzer 102 of the monitoring system 10 has identified the detected sound (by identifying its source and/or its category (opening/closing, beep, rain, etc.), this corresponding to a state of the monitoring system and a first exemplary result referred to as the "sound identified" state/result. The monitoring system 10 accordingly commands the visual physical indicator to simulate a facial attitude corresponding to that adopted when the detected sound is known because identified: in the present case by transmitting a command parameter that causes an eye with a round pupil to be simulated, and especially by indicating in the command parameter the type of simulated eye $pcmd_1$=ty(o).

Optionally, if the device 1 for performing environmental analysis comprises a matrix-array screen, it accordingly commands the visual physical indicator to render this identification: in the present case by transmitting a command parameter depending on a source of the identified sound or a category of the identified sound, $pcmd_2$=$id_O$ or $pcmd_2$=ctg, respectively.

Figure 6E:
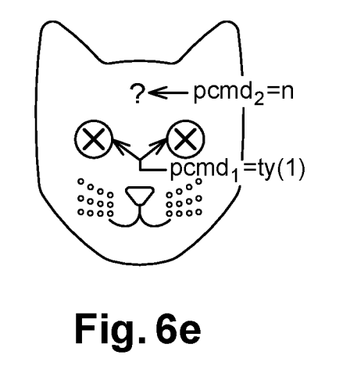

FIG. 6e illustrates a simplified schematic of a device for performing environmental analysis in a second example of a monitoring result according to the invention.

In this second example of a result, the analyzer 102 of the monitoring system 10 has been unable to identify any information regarding the detected sound (neither its identification, nor its category, nor its position, etc.), this corresponding to a second exemplary result referred to as the "incomprehension" result. The monitoring system 10 accordingly commands the visual physical indicator to simulate a facial attitude corresponding to that adopted when the detected sound is not understood: in the present case by transmitting a command parameter that causes an eye with a cross-shaped pupil to be simulated, and especially by indicating in the command parameter the type of simulated eye pcmd=ty(x).

Figure 6F:
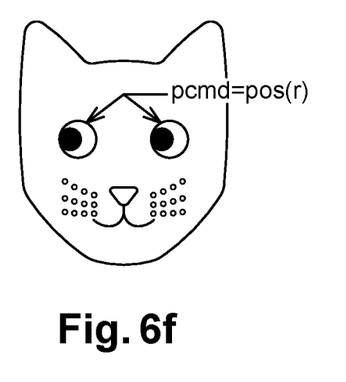

FIG. 6f illustrates a simplified schematic of a device for performing environmental analysis in a third example of a monitoring result according to the invention.

In this third example of a result, the analyzer 102 of the monitoring system 10 has identified the position of the source of the detected sound, this corresponding to a third exemplary result referred to as the "direction of audio source" result. The monitoring system 10 accordingly commands the visual physical indicator to simulate a facial attitude corresponding to that adopted when a sound is heard to come from a given direction: in the present case by transmitting a command parameter that causes an eye directed toward this source to be simulated, and especially by indicating in the command parameter the position of the pupil of the simulated eye pcmd=pos(r).

FIG. 6f may also illustrate a simplified schematic of a device for performing environmental analysis in one example of a direction of focus of monitoring according to the invention.

In this example of a monitoring direction, the analyzer 102 of the monitoring system 10 identifies the direction in which the monitoring system is focusing its attention. The monitoring system 10 accordingly commands the visual physical indicator to simulate a facial attitude corresponding to the given monitoring direction: in the present case by transmitting a command parameter that causes an eye directed in the monitoring direction to be simulated, and especially by indicating in the command parameter the position of the pupil of the simulated eye pcmd=pos(r).

Optionally, to distinguish between the monitoring direction and the direction of a detected sound, the command parameter, for a given simulated-eye position, will specify a different shape depending on the action of the analysis-performing device: monitoring or detected sound. For example, the simulated eye will take the form of a vertically slitted eye in the case of monitoring and of a simulated eye of the pupil of which is round in the case of a detected sound.

Figure 6G:
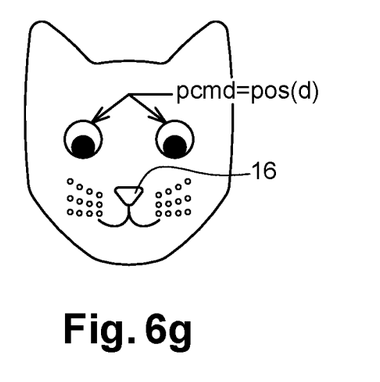

FIG. 6g illustrates a simplified schematic of a device for performing environmental analysis in an exemplary state of the analyzing device according to the invention.

In this exemplary state of the analysis-performing device, the device for performing environmental analysis is in the process of activating, especially following a press by the user on an on/off button 16 or a voice-activation command, etc. The monitoring system 10 accordingly commands the visual physical indicator to simulate a facial attitude corresponding to that adopted when it wakes up: in the present case by transmitting a command parameter that causes a downward-directed eye to be simulated, and especially by indicating in the command parameter the position of the pupil of the simulated eye pcmd=pos(d).

FIGS. 6a to 6g illustrate a device 1 for performing environmental analysis simulating the face of a cat. Generally, it may simulate the face of any animal, human being or virtual being. The device 1 for performing environmental analysis then functions in a way analogous to the behavior of this living being: the visual physical indicator simulating one or more eyes simulates the focus of the gaze on the person who is speaking; if there are more than one people in conversation in the environment E, the visual physical indicator simulating one or more eyes simulates the gaze passing from one person to the next depending on who is currently speaking; if a noise/a new sound is detected, the visual physical indicator simulating one or more eyes simulates the gaze turning toward this noise. The interface 11 indicates focus by the monitoring system 10 on a specific source, whether audio or of another type, human or of another type, etc., being analyzed by the monitoring system 10 and/or processed by the monitoring system with a view to commanding a third-party device 3 and/or forming the subject of a request by a voice assistant 6 (see FIG. 7) implementing the monitoring system 11, 611. The interface 11 embodies this focus, which indicates to the users present in the environment E the source that is currently being processed by the monitoring system 11 and/or the voice assistant 6, even though the monitoring system continues to monitor all of the environment E. This monitoring task (or audio surveillance in the case where audio is monitored) is clearly understandable to humans, who consider it merely to be one of vigilance involving neither understanding nor identification of the various audio sources present in parallel with the source on which the device 1 for performing environmental analysis and/or the voice assistant is focused. Thus, users perceive only that the machine: the device 1 for performing environmental analysis and/or the voice assistant 6, is not listening to "everything", which should improve confidence in and acceptance of these types of device, smart speakers in particular.

Figure 7:
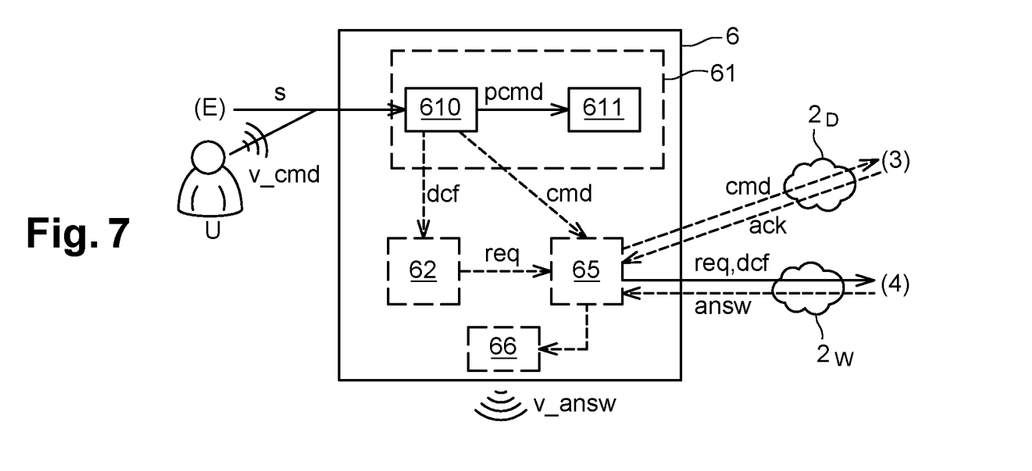

FIG. 7 illustrates a simplified schematic of a voice assistant according to the invention.

A voice assistant 6 connected to a communication network 2W allows at least one service performed by a communication device 4 of the communication network to be controlled, the voice speaker comprising:
- a system 610 for monitoring an environment E in which the voice assistant 6 is placed, and
- a visual physical indicator 611 controlled depending on at least one command parameter pcmd delivered by the monitoring system 610.

In particular, the voice assistant 6 comprises a device 61 for performing environmental analysis, which implements the monitoring system 610 and the visual physical indicator 611.

Thus, when a user U present in the environment E addresses a voice command v_cmd to the voice assistant 6, the monitoring system 610 captures this voice command v_cmd with the ambient sounds of the environment E in an audio signal s and controls the visual physical indicator 611 in order to simulate a facial attitude identifying the source, especially by directing the eyes simulated by this visual physical indicator 611 toward the user U, once the monitoring system 610 has identified the position of a voice-command source in the received signal s.

In parallel, the voice assistant processes the voice command identified in the received signal s. In particular, the monitoring system 610 transmits the filtered captured data dcf corresponding to the voice command identified in the received signal s to a request generator 62. The request generator 62 integrates into a request intended for a communication device 4, especially a service-performing device, the identified command either directly (by integrating the command in voice format) or indirectly by integrating a command depending on the identified voice command (especially defined by performing voice recognition on the received voice command and optionally by converting the recognized natural-language command into a text command formatted depending on the language of the request).

In particular, the voice assistant 6 comprises a transmitter 65 that sends the identified command to a communication device 4, especially a service-performing device, either directly the command dcf delivered by the monitoring system 610, or a request req generated by a request generator 62 and comprising the identified command dcf.

In particular, the communication device 4 sends a reply answ to the request req, dcf. The transmitter 65 receives this reply answ and transmits it to a rendering device 66. In particular, the rendering device 66 is a voice-rendering device. In this case, either the reply answ sent by the communication device 4 comprises a reply in voice format, or the rendering device 66 comprises a voice synthesizer (not illustrated) that converts the received reply answ into voice format before rendering it. In particular, the voice-rendering device 66 comprises one or more loudspeakers such as the loudspeakers $17_1$ and $17_2$ of the device 1 for performing environmental analysis of FIG. 3.

Optionally, the monitoring system 610 commands cmd in parallel a communication device 3 of a local network 2D as illustrated in FIG. 7 or of a remote network 2W. The communication device 3 is especially a communication device of a home-automation apparatus (control center, shutter, window/door shutting system, heating, lighting, etc.), a communication device of a multimedia apparatus (smart TV, TV decoder, recorder, etc.), a connected object, etc.

In summary, the one or more microphones of the monitoring system 610 capture an ambience s and give, by means of the invention, feedback to the people present in the environment E, who include the user U, so as to explain what it can hear/is listening to, which was previously not the case with voice assistants.

Thus, the dialogue between the user and the voice assistant 6 is encouraged by the addition of the modality for performing environmental analysis, this modality being implemented by the monitoring system 610 combined with the visual physical indicator 611. Use with the physical indicator 611 simulating a face of a living being of a morphological interaction further decreases the discomfort of interaction with a machine: the voice assistant 6.

Figure 8:
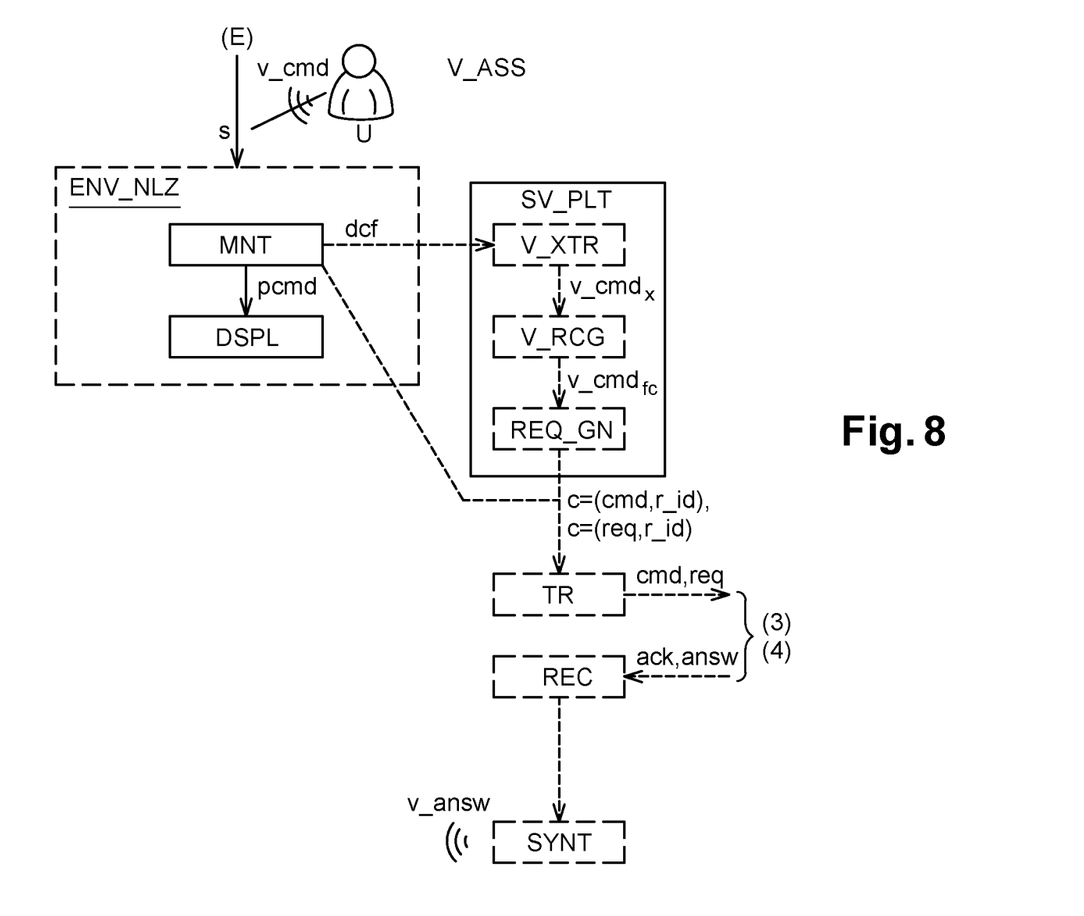

FIG. 8 illustrates a simplified schematic of a voice-assistance method according to the invention.

A voice-assistance method V_ASS implemented by a communication terminal connected to a communication network, comprising controlling SV_PLT at least one service performed by a communication device of the communication network other than the communication terminal, the voice-assistance method comprising:
- monitoring MNT an environment E in which the communication terminal is placed,
- generating a visual physical rendering DSPL depending on a command parameter pcmd resulting from the analysis of the captured data.

In particular, the voice-assistance method V_ASS comprises an environmental analysis ENV_NLZ employing the monitoring MNT and visual physical rendering DSPL.

Thus, when a user U present in the environment E addresses a voice command v_cmd to the voice assistance V_ASS. The monitoring MNT captures this voice command v_cmd with the ambient sounds of the environment E in an audio signal s and commands the visual physical rendering DSPL in order to simulate a facial attitude identifying the source.

In parallel, the voice assistance V_ASS processes the voice command identified in the received signal s. In particular, the monitoring MNT transmits the filtered captured data dcf corresponding to the voice command identified in the received signal s to a request generation REQ_GN. The request generation REQ_GN integrates, into a request intended for a communication device 4, especially a service-performing device, the identified command either directly (by integrating the command in voice format) or indirectly by integrating a command depending on the identified voice command (especially defined by performing voice recognition on the received voice command and optionally by converting the recognized natural-language command into a text command formatted depending on the language of the request).

In particular, the service control SV_PLT comprises extracting V_XTR the voice command from the filtered captured data dcf containing it. Optionally, the service control SV_PLT comprises voice recognition V_RCG that converts the voice command into a natural-language text command.

In particular, the voice assistance V_ASS comprises a transmission TR that sends the identified command c to a communication device 4, especially a service-performing device, either directly the command dcf delivered by the monitoring MNT, or the extracted command v_cmd$_x$, or the recognized command v_cmd$_c$, or a request req generated by a request generation REQ_GN and comprising the identified command dcf, or the extracted command v_cmd$_x$, or the recognized command v_cmd$_c$.

In particular, the communication device 4 sends a reply answ to the request req. The reception REC receives this reply answ and delivers it to a rendition SYNT. In particular, the rendition SYNT is a voice rendition. In this case, either the reply answ sent by the communication device 4 comprises a reply in voice format, or the rendition comprises a voice synthesizer (not illustrated) that converts the received reply answ into voice format before rendering it.

Optionally, the monitoring MNT commands cmd in parallel a communication device 3 of a communication network. Where appropriate, the communication device 3 may send in return an acknowledgement of receipt of the command or an acknowledgement of execution of the command ack. The reception REC receives this acknowledgement ack and delivers a rendition SYNT thereof. In the case where the rendition is a voice rendition, either the acknowledgement ack sent by the communication device 3 is in voice format, or the rendition comprises a voice synthesizer (not illustrated) that converts the received acknowledgement ack into voice format before rendering it.

In one particular embodiment, the method ENV_NLZ for performing environmental analysis is implemented in the form of a program containing program-code instructions for executing steps of the voice-assistance method when said program is executed by a processor.

The invention also relates to a medium. The data medium may be any entity or device capable of storing the program. For example, the medium may comprise a storage means, such as a ROM, for example a CD-ROM or a microelectronic circuit ROM, or else a magnetic recording means, for example a floppy disk or a hard disk.

Moreover, the data medium may be a transmissible medium such as an electrical or optical signal that may be conveyed via an electrical or optical cable, by radio or by other means. The program according to the invention may in particular be downloaded over a network, in particular the Internet.

Alternatively, the data medium may be an integrated circuit into which the program is incorporated, the circuit being suitable for executing or being used in the execution of the method in question.

In another implementation, the invention is implemented by way of software and/or hardware components. With this in mind, the term module may correspond either to a software component or to a hardware component. A software component corresponds to one or more computer programs, one or more subroutines of a program or, more generally, to any element of a program or of software package that is able to implement a function or a set of functions in accordance with the above description. A hardware component corresponds to any element of a hardware assembly that is able to implement a function or a set of functions.

The invention claimed is:

1. An electronic device for performing environmental analysis, the electronic device for performing environmental analysis being placed within a monitored room and comprising:

a monitoring system placed within the monitored room and configured to monitor the monitored room, the monitoring system including at least one sensor for capturing signals within the monitored room and producing monitoring data corresponding to a current monitoring operation of the monitoring system, the monitoring system delivering at least one command parameter based on the current monitoring operation of the monitoring system;

an analyzer located within the monitored room configured to analyze the monitoring data; and at least one rendering device connected to the monitoring system and located within the monitored room, the rendering device configured to generate a monitoring operation visual physical body indicator within the monitored room for signaling the current monitoring operation of the monitoring system to anyone present in the monitored room based on the delivered at least one command parameter from the monitoring system.

2. The electronic device for performing environmental analysis as claimed in claim 1, wherein the command parameter is dependent on at least one parameter of an analysis capacity of the monitoring system.

3. The electronic device for performing environmental analysis as claimed in claim 1, wherein the monitoring operation visual physical body indicator comprises a simulation of a facial element of a living being.

4. The electronic device for performing environmental analysis as claimed in claim 1, wherein the at least one rendering device comprises a set of rendering devices.

5. The electronic device for performing environmental analysis as claimed in claim 4, wherein, when the set of rendering devices comprises more than one rendering device, the rendering devices of the set are conjointly controllable depending on the at least one command parameter delivered by the monitoring system.

6. The electronic device for performing environmental analysis as claimed in claim 1, wherein the at least one delivered command parameter is based on the analysis of the monitoring data performed by the analyzer.

7. The electronic device for performing environmental analysis as claimed in claim 1, wherein the at least one sensor of the monitoring system are components of at least one system from the following:
a listening system;
a video monitoring system; and
a haptic/touch monitoring system.

8. The electronic device for performing environmental analysis as claimed in claim 7, wherein the at least one sensor includes a plurality of unitary microphones of the listening system forming an array of microphones integrated into the device for performing environmental analysis.

9. The electronic device for performing environmental analysis as claimed in claim 1, wherein the electronic device for performing environmental analysis comprises at least one connector allowing transmission of a command from the electronic device performing environmental analysis to a controllable electronic device, the command being delivered by the monitoring system.

10. A method for performing environmental analysis of a monitored room, said method being implemented by an electronic device that is placed within the monitored room for performing environmental analysis and comprising:

monitoring the monitored room using a monitoring system of the electronic device that is located within the monitored room, the monitoring including capturing signals within the monitored room using at least one sensor of the monitoring system;

producing monitoring data using the monitoring system corresponding to a current monitoring operation of the monitoring system;

delivering a command parameter using the monitoring system based on the current monitoring operation of the monitoring system;

analyze the monitoring data using an analyzer that is located within the monitored room; and generating a monitoring operation visual physical body indicator within the monitored room using at least one rendering device of the electronic device that is connected to the monitoring system and located within the monitored room, the generated monitoring operation visual physical body indicator signaling the current monitoring operation of the monitoring system to anyone present in the monitored room based on the delivered command parameter.

11. The method for performing environmental analysis as claimed in claim 10, wherein the command parameter is determined on the basis of a portion of the monitoring data, the portion of the monitoring data being relative to one data source in the monitored room.

12. The method for performing environmental analysis as claimed in claim 10, wherein delivering the command parameter is based on the analysis of the monitoring data by the analyzer.

13. The method for performing environmental analysis as claimed in claim 12, wherein the method for performing environmental analysis comprises sending a notification to a communication terminal, the notification being generated depending on a result of the analysis of the monitoring data.

14. A voice assistant device connected to a communication network allowing at least one service performed by a communication device of the communication network to be controlled, the voice assistant device being placed within a monitored room and comprising:

a monitoring system placed within the monitored room and configured to monitor the monitored room, the monitoring system including at least one sensor for capturing signals within the monitored room and producing monitoring data corresponding to a current monitoring operation of the monitoring system, the monitoring system delivering at least one command parameter based on the current monitoring operation of the monitoring system;

an analyzer located within the monitored room configured to analyze the monitoring data; and at least one rendering device connected to the monitoring system and located within the monitored room, the rendering device configured to generate a monitoring operation visual physical body indicator within the monitored room for signaling the current monitoring operation of the monitoring system to anyone present in the monitored room based on the delivered at least one command parameter from the monitoring system.

15. A voice-assistance method implemented by a communication terminal placed within a monitored room and connected to a communication network, comprising controlling at least one service performed by a communication device of the communication network other than the communication terminal, the voice-assistance method comprising:

monitoring the monitored room using a monitoring system of the communication terminal that is located within the monitored room, the monitoring including capturing signals within the monitored room using at least one sensor of the monitoring system;

producing monitoring data using the monitoring system corresponding to a current monitoring operation of the monitoring system;

delivering a command parameter using the monitoring system based on the current monitoring operation of the monitoring system;

analyzing the monitoring data using an analyzer that is located within the monitored room; and generating a monitoring operation visual physical body indicator within the monitored room using at least one rendering device of the communication terminal that is connected to the monitoring system and located within the monitored room, the generated monitoring operation visual physical body indicator signaling the current monitoring operation of the monitoring system to anyone present in the monitored room based on the delivered command parameter.

16. A non-transitory computer-readable medium comprising instructions program-code instructions stored thereon for executing a method for performing environmental analysis of monitored room when said program is executed by a processor of an electronic device that is placed within the monitored room, wherein the instructions configure the electronic device to:

monitor the monitored room using a monitoring system of the electronic device that is located within the monitored room, the monitoring including capturing signals within the monitored room using at least one sensor of the monitoring system;

produce monitoring data using the monitoring system corresponding to a current monitoring operation of the monitoring system;

deliver a command parameter using the monitoring system based on the current monitoring operation of the monitoring system;

analyze the monitoring data using an analyzer that is located within the monitored room; and generate a monitoring operation visual physical body indicator within the monitored room using at least one rendering device of the electronic device that is connected to the monitoring system and located within the monitored room, the generated monitoring operation visual physical body indicator signaling the current monitoring operation of the monitoring system to anyone present in the monitored room based on the delivered command parameter.

* * * * *